G. A. KENNER, W. H. MICHAEL & T. J. BURTON.
PNEUMATIC PUSH BUTTON AND PUMP.
APPLICATION FILED AUG. 10, 1911.
1,015,962.
Patented Jan. 30, 1912.
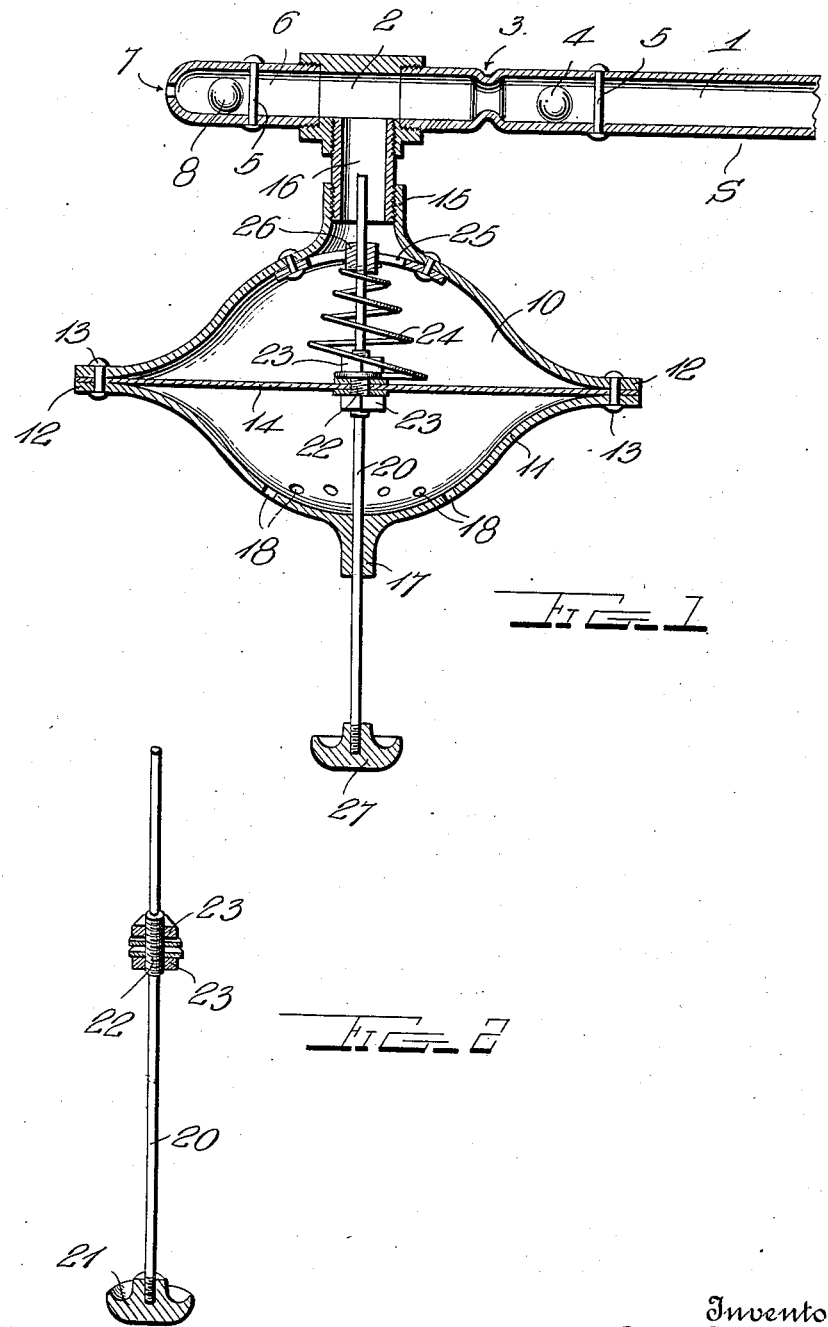

UNITED STATES PATENT OFFICE.

GEORGE A. KENNER, OF HERRIN, AND WILLIAM H. MICHAEL AND THOMAS J. BURTON, OF MURPHYSBORO, ILLINOIS.

PNEUMATIC PUSH-BUTTON AND PUMP.

1,015,962.      Specification of Letters Patent.      Patented Jan. 30, 1912.

Application filed August 10, 1911. Serial No. 643,349.

*To all whom it may concern:*

Be it known that we, GEORGE A. KENNER, a citizen of the United States, residing at Herrin, county of Williamson, State of Illinois, and WILLIAM H. MICHAEL and THOMAS J. BURTON, citizens of the United States, residing at Murphysboro, in the county of Jackson and State of Illinois, have invented certain new and useful Improvements in Pneumatic Push-Buttons and Pumps; and we do declare the following to be a full, clear, and exact description of the invention, such as will enable others skilled in the art to which it appertains to make and use the same.

This invention relates to signals, and more especially to pneumatic signals; and the object of the same is to produce an improved reciprocating push button for creating a fluid impulse along a signal line to a remote point while avoiding the back pressure or suction which commonly takes place along that line. This object is accomplished by the construction hereinafter more fully described and claimed and shown in the drawings wherein—

Figure 1 is a general longitudinal sectional view through the entire device and a portion of the tubing forming the inner end of the signal line, showing all parts at rest; Fig. 2 is an enlarged perspective detail of the stem and the parts connected therewith.

In the drawings the letter S designates a signal line, here comprising specifically a tube 1 connected at one end with one end of the head of a T-coupling 2 and its other extremity leading to a remote point (not shown), this piece of tubing having an annular indentation 3 adjacent said T-coupling forming a valve seat for a ball valve 4, and near the same a cross rod or bolt 5 forming a stop to check the movement of said ball valve when forced away from its seat. The signal line also comprises a second section of tube 6 connected with the other end of the head of the T-coupling 2, having a similar rod 5 through it, and having its outer end closed except for a fine inlet aperture 7 against which normally rests another ball valve 8 which plays between this end of the tube and the rod 5. Thus it will be seen that if an impulse of compressed air or other similar fluid is driven through the stem of the T-coupling 2, the ball 8 will be driven against the aperture 7 to close the same and the ball 4 will be driven away from its seat 3 to open this valve so that the air within the tubing and the head of the T-coupling will be forced along the signal line and a signal at a remote point may be operated thereby. In conjunction with this pipe line and valves we preferably employ the following construction of push button which constitutes the gist of the present invention. The numerals 10 and 11 designate the upper and lower members or halves of a suitable casing, both being substantially cup-shaped with their flanges 12 connected by rivets or bolts 13. Between these flanges and by said bolts is secured the edges of a flexible diaphragm 14 which is sufficiently loose within the casing to have some considerable play when desired. The upper half 10 has a neck 15 connected by a short pipe section 16 with the stem of the T-coupling 2, and the lower half 11 has a perforated boss 17 and around the same several perforations 18 so as to admit air easily and freely below the diaphragm 14, while the space above said diaphragm and within the upper half or member is closed to the air excepting through its neck 15 which the pipe section 16 connects with the piping above described. Through said boss slides the stem 20 having a knob 21 screwed on its outer end and standing some little distance from the boss 17 so that it may be either borne inward toward said boss or drawn outward from it as desired. Midway of the length of this stem it is enlarged and threaded as at 22 to receive two nuts 23 above and below the diaphragm and by means of which the latter is clamped in place upon the stem and removably and adjustably secured thereto. Upon the diaphragm by the upper nut is clamped the lower end of a spring 24 whose body is coiled around the stem with its upper end connected to a bridge 25 secured across the interior of the upper half 10 and having a guide 26 through which the upper end of the stem slides freely; and in its normal condition, without its coils having been either expanded or contracted, the spring stands as shown in Fig. 1 so that the diaphragm is flat and the spaces or chambers above and below it are equal. All parts are of the desired sizes, shapes, proportions and materials, and by preference the proportion adopted will be such as is necessary to correspond with the size of the signal line and the distance to which the pneumatic impulse is to be sent.

The parts normally stand as seen in Fig. 1. If now an impulse is to be sent along the signal line, the operator presses the knob 21 toward the casing, which causes the diaphragm to move in the latter as the spring 24 will permit, the perforations 18 admitting air behind the diaphragm so that no vacuum will be produced. The air in front of the diaphragm is driven through the pipe section 16 into the T-coupling 2, and as it cannot escape past the inlet valve 8 it is forced in the opposite direction past the valve 4 and along the signal line S. When pressure on the knob is released, the spring 24 expands and suction is created within the inner portion of the casing and within the T-coupling 2, and this suction draws the valve 4 to its seat 3 and draws the valve 8 off its seat so as to open the inlet perforation 7 and admit a charge of air from the exterior. Assuming now that for some reason the stem 20 should stick in its guides 17 and 26 and, although it is highly important that a signal be communicated through the signal line S to a remote point, pressure upon the knob does not produce the result imperatively desired. It will be seen that the operator can grasp the knob and reciprocate the stem through its guide so as to cause a movement to and fro of the diaphragm 14 to set up first pressure and then suction within the T-coupling, and the disposition of the two valves in the tube sections with their seats oppositely disposed toward the T-coupling will result in the pumping of a supply of air along the signal line so that the alarm at a remote point will be certain to be sounded. On occasions also the spring 24 may stick or become weakened by continued use, and the knob and stem will not be projected thereby to stand as shown in Fig. 1; and this objection can also be readily overcome by grasping the knob in the hand and drawing it outward before inward pressure thereon is given to set up the fluid impulse and sound the alarm. It is obvious that as it is drawn outward the air in front of it is expelled through the perforations 18, after which inward pressure on the knob performs the function ascribed to it above. In case either valve should become choked or stuck in its tube section, the latter is readily removed from the T-coupling for purposes of cleansing and repair.

A striking feature of this invention lies in the fact that when pressure on the knob is removed and the spring restores the diaphragm to the position shown in Fig. 1, the suction above it thereby created draws air inward through the inlet aperture rather than creating a suction along the signal line as so commonly occurs in devices of this character and which often produces a supplemental signal at a remote point which is not desired. Again, suppose the signal line should spring a leak and an ordinary impulse would not sound the signal; with the construction described above the operator could rapidly reciprocate the knob and a series of several quite vigorous impulses would be pumped down the signal line so that sufficient air would accumulate therein to flow past a good-sized leak and sound an alarm in spite of it.

What is claimed as new is:

The herein described pneumatic push button and pump comprising a casing made up of two cup-shaped members having flanges around their mouths which are disposed toward each other, one member being closed except for a neck opening through its bottom and the other member having a tubular boss through its bottom opposite the axis of said neck and a series of perforations through its body, a bridge secured across the first-named member and carrying a guide in line with the axis of its neck, a flexible diaphragm clamped between the mouths of said members, a stem passing through the center of said diaphragm and movably mounted in said guide and boss and having a knob at its outer extremity, nuts engaging the stem above and below the diaphragm, and a spring coiled around the stem and having one end engaged by one of the nuts and the other end secured to said guide, the spring in its normal condition holding said diaphragm flat but being capable of expansion or contraction by manipulation of said knob.

In testimony whereof we have hereunto set our hands in presence of two subscribing witnesses.

GEORGE A. KENNER.
WILLIAM H. MICHAEL.
THOMAS J. BURTON.

Witnesses to the signature of George A. Kenner:
HARRY WOODS,
ROBERT FOLKEL.

Witnesses to the signatures of William H. Michael and Thomas J. Burton:
C. V. TELLETT,
DAVE RANBAUGH.

---

Copies of this patent may be obtained for five cents each, by addressing the "Commissioner of Patents, Washington, D. C."